United States Patent
Lo et al.

(10) Patent No.: US 10,616,072 B1
(45) Date of Patent: Apr. 7, 2020

(54) EPOCH DATA INTERFACE

(71) Applicant: Cisco Technology, Inc., San Jose, CA (US)

(72) Inventors: Chien-Ju Lo, Fremont, CA (US); Bill YuFan Chen, Los Gatos, CA (US); Kannan Ponnuswamy, Murphy, TX (US); Kollivakkam Raghavan, San Jose, CA (US); Navneet Yadav, Cupertino, CA (US); Manvesh Vyas, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 61 days.

(21) Appl. No.: 16/047,817

(22) Filed: Jul. 27, 2018

(51) Int. Cl.
*H04L 12/24* (2006.01)
*H04L 12/26* (2006.01)

(52) U.S. Cl.
CPC .......... *H04L 41/142* (2013.01); *H04L 41/064* (2013.01); *H04L 41/0631* (2013.01); *H04L 41/12* (2013.01); *H04L 41/14* (2013.01); *H04L 41/145* (2013.01); *H04L 41/22* (2013.01); *H04L 43/04* (2013.01); *H04L 43/067* (2013.01); *H04L 41/16* (2013.01)

(58) Field of Classification Search
CPC ............. H04L 41/04; H04L 41/06–065; H04L 41/0677–069; H04L 41/12–145; H04L 43/067; H04L 45/28; H04L 49/557
See application file for complete search history.

(56) References Cited

U.S. PATENT DOCUMENTS

| | | | |
|---|---|---|---|
| 5,204,829 | A | 4/1993 | Lyu et al. |
| 6,763,380 | B1 | 7/2004 | Mayton et al. |
| 7,003,562 | B2 | 2/2006 | Mayer |
| 7,089,369 | B2 | 8/2006 | Emberling |
| 7,127,686 | B2 | 10/2006 | Dreschler et al. |

(Continued)

FOREIGN PATENT DOCUMENTS

| | | |
|---|---|---|
| CN | 105471830 | 4/2016 |
| CN | 105721193 | 6/2016 |

(Continued)

OTHER PUBLICATIONS

Cisco Systems, Inc., "The Cisco Application Policy Infrastructure Controller Introduction: What is the Cisco Application Policy Infrastructure Controller?" Jul. 31, 2014, 19 pages.

(Continued)

*Primary Examiner* — Brendan Y Higa
(74) *Attorney, Agent, or Firm* — Polsinelli PC

(57) ABSTRACT

Systems, methods, and devices are disclosed for generating an interface configured to display status information for network elements on a network. In embodiments, one or more logical models of the network are obtained from at least one of a plurality of controllers on a network. Network statistics are determined based on network traffic. Based on the one or more logical models and the network statistics, a topology of the network and respective status information of one or more network elements during an epoch is identified, the epoch defining a time interval. A user interface is generated that displays the respective status information in a timeline comprising one or more of the epochs.

20 Claims, 13 Drawing Sheets

(56) References Cited

U.S. PATENT DOCUMENTS

| | | |
|---|---|---|
| 7,360,064 B1 | 4/2008 | Steiss et al. |
| 7,453,886 B1 | 11/2008 | Allan |
| 7,505,463 B2 | 3/2009 | Schuba et al. |
| 7,548,967 B2 | 6/2009 | Amyot et al. |
| 7,552,201 B2 | 6/2009 | Areddu et al. |
| 7,609,647 B2 | 10/2009 | Turk et al. |
| 7,619,989 B2 | 11/2009 | Guingo et al. |
| 7,698,561 B2 | 4/2010 | Nagendra et al. |
| 7,743,274 B2 | 6/2010 | Langford et al. |
| 7,765,093 B2 | 7/2010 | Li et al. |
| 8,010,952 B2 | 8/2011 | Datla et al. |
| 8,073,935 B2 | 12/2011 | Viswanath |
| 8,103,480 B2 | 1/2012 | Korn et al. |
| 8,190,719 B2 | 5/2012 | Furukawa |
| 8,209,738 B2 | 6/2012 | Nicol et al. |
| 8,261,339 B2 | 9/2012 | Aldridge et al. |
| 8,312,261 B2 | 11/2012 | Rao et al. |
| 8,375,117 B2 | 2/2013 | Venable, Sr. |
| 8,441,941 B2 | 5/2013 | McDade et al. |
| 8,479,267 B2 | 7/2013 | Donley et al. |
| 8,484,693 B2 | 7/2013 | Cox et al. |
| 8,494,977 B1 | 7/2013 | Yehuda et al. |
| 8,554,883 B2 | 10/2013 | Sankaran |
| 8,589,934 B2 | 11/2013 | Makljenovic et al. |
| 8,621,284 B2 | 12/2013 | Kato |
| 8,627,328 B2 | 1/2014 | Mousseau et al. |
| 8,693,344 B1 | 4/2014 | Adams et al. |
| 8,693,374 B1 | 4/2014 | Murphy et al. |
| 8,761,036 B2 | 6/2014 | Fulton et al. |
| 8,782,182 B2 | 7/2014 | Chaturvedi et al. |
| 8,824,482 B2 | 9/2014 | Kajekar et al. |
| 8,910,143 B2 | 12/2014 | Cohen et al. |
| 8,914,843 B2 | 12/2014 | Bryan et al. |
| 8,924,798 B2 | 12/2014 | Jerde et al. |
| 9,019,840 B2 | 4/2015 | Salam et al. |
| 9,038,151 B1 | 5/2015 | Chua et al. |
| 9,055,000 B1 | 6/2015 | Ghosh et al. |
| 9,106,555 B2 | 8/2015 | Agarwal et al. |
| 9,137,096 B1 | 9/2015 | Yehuda et al. |
| 9,225,601 B2 | 12/2015 | Khurshid et al. |
| 9,246,818 B2 | 1/2016 | Deshpande et al. |
| 9,264,922 B2 | 2/2016 | Gillot et al. |
| 9,276,877 B1 | 3/2016 | Chua et al. |
| 9,319,300 B2 | 4/2016 | Huynh Van et al. |
| 9,344,348 B2 | 5/2016 | Ivanov et al. |
| 9,369,434 B2 | 6/2016 | Kim et al. |
| 9,389,993 B1 | 7/2016 | Okmyanskiy et al. |
| 9,405,553 B2 | 8/2016 | Branson et al. |
| 9,444,842 B2 | 9/2016 | Porras et al. |
| 9,497,207 B2 | 11/2016 | Dhawan et al. |
| 9,497,215 B2 | 11/2016 | Vasseur et al. |
| 9,544,224 B2 | 1/2017 | Chu et al. |
| 9,548,965 B2 | 1/2017 | Wang et al. |
| 9,553,845 B1 | 1/2017 | Talmor et al. |
| 9,571,502 B2 | 2/2017 | Basso et al. |
| 9,571,523 B2 | 2/2017 | Porras et al. |
| 9,594,640 B1 | 3/2017 | Chheda |
| 9,596,141 B2 | 3/2017 | McDowall |
| 9,641,249 B2 | 5/2017 | Kaneriya et al. |
| 9,654,300 B2 | 5/2017 | Pani |
| 9,654,361 B2 | 5/2017 | Vasseur et al. |
| 9,654,409 B2 | 5/2017 | Yadav et al. |
| 9,660,886 B1 | 5/2017 | Ye et al. |
| 9,660,897 B1 | 5/2017 | Gredler |
| 9,667,645 B1 | 5/2017 | Belani et al. |
| 9,680,875 B2 | 6/2017 | Knjazihhin et al. |
| 9,686,180 B2 | 6/2017 | Chu et al. |
| 9,686,296 B1 | 6/2017 | Murchison et al. |
| 9,690,644 B2 | 6/2017 | Anderson et al. |
| 9,781,004 B2 | 10/2017 | Danait et al. |
| 9,787,559 B1 | 10/2017 | Schroeder |
| 9,998,247 B1 | 6/2018 | Choudhury et al. |
| 10,084,795 B2 | 9/2018 | Akireddy et al. |
| 10,084,833 B2 | 9/2018 | McDonnell et al. |
| 10,084,895 B2 | 9/2018 | Kasat et al. |
| 2002/0143855 A1 | 10/2002 | Traversat et al. |
| 2002/0178246 A1 | 11/2002 | Mayer |
| 2003/0229693 A1 | 12/2003 | Mahlik et al. |
| 2004/0073647 A1 | 4/2004 | Gentile et al. |
| 2004/0168100 A1 | 8/2004 | Thottan et al. |
| 2005/0091482 A1* | 4/2005 | Gray ............... H04L 41/5058 713/151 |
| 2005/0108389 A1 | 5/2005 | Kempin et al. |
| 2007/0011629 A1 | 1/2007 | Shacham et al. |
| 2007/0124437 A1 | 5/2007 | Chervets |
| 2007/0214244 A1 | 9/2007 | Hitokoto et al. |
| 2008/0031147 A1 | 2/2008 | Fieremans et al. |
| 2008/0117827 A1 | 5/2008 | Matsumoto et al. |
| 2008/0133731 A1 | 6/2008 | Bradley et al. |
| 2008/0172716 A1 | 7/2008 | Talpade et al. |
| 2009/0240758 A1 | 9/2009 | Pasko et al. |
| 2009/0249284 A1 | 10/2009 | Antosz et al. |
| 2010/0027432 A1* | 2/2010 | Gopalan ............... H04L 41/142 370/252 |
| 2010/0191612 A1 | 7/2010 | Raleigh |
| 2010/0198909 A1 | 8/2010 | Kosbab et al. |
| 2011/0093612 A1 | 4/2011 | Murakami |
| 2011/0295983 A1 | 12/2011 | Medved et al. |
| 2012/0054163 A1 | 3/2012 | Liu et al. |
| 2012/0198073 A1 | 8/2012 | Srikanth et al. |
| 2012/0297061 A1 | 11/2012 | Pedigo et al. |
| 2013/0097660 A1 | 4/2013 | Das et al. |
| 2013/0191516 A1 | 7/2013 | Sears |
| 2014/0019597 A1 | 1/2014 | Nath et al. |
| 2014/0177638 A1 | 6/2014 | Bragg et al. |
| 2014/0222996 A1 | 8/2014 | Vasseur et al. |
| 2014/0304831 A1 | 10/2014 | Hidlreth et al. |
| 2014/0307556 A1 | 10/2014 | Zhang |
| 2014/0321277 A1 | 10/2014 | Lynn, Jr. et al. |
| 2014/0379915 A1 | 12/2014 | Yang et al. |
| 2015/0019756 A1 | 1/2015 | Masuda |
| 2015/0113143 A1 | 4/2015 | Stuart et al. |
| 2015/0124826 A1 | 5/2015 | Edsall et al. |
| 2015/0186206 A1 | 7/2015 | Bhattacharya et al. |
| 2015/0234695 A1 | 8/2015 | Cuthbert et al. |
| 2015/0244617 A1 | 8/2015 | Nakil et al. |
| 2015/0271104 A1 | 9/2015 | Chikkamath et al. |
| 2015/0295771 A1 | 10/2015 | Cuni et al. |
| 2015/0365314 A1 | 12/2015 | Hiscock et al. |
| 2015/0381484 A1 | 12/2015 | Hira et al. |
| 2016/0020993 A1 | 1/2016 | Wu et al. |
| 2016/0021141 A1 | 1/2016 | Liu et al. |
| 2016/0026631 A1 | 1/2016 | Salam et al. |
| 2016/0036636 A1* | 2/2016 | Erickson ............... H04L 41/145 370/248 |
| 2016/0048420 A1 | 2/2016 | Gourlay et al. |
| 2016/0078220 A1 | 3/2016 | Scharf et al. |
| 2016/0080350 A1 | 3/2016 | Chaturvedi et al. |
| 2016/0099883 A1 | 4/2016 | Voit et al. |
| 2016/0105317 A1 | 4/2016 | Zimmermann et al. |
| 2016/0112246 A1 | 4/2016 | Singh et al. |
| 2016/0112269 A1 | 4/2016 | Singh et al. |
| 2016/0149751 A1 | 5/2016 | Pani et al. |
| 2016/0164748 A1 | 6/2016 | Kim |
| 2016/0224277 A1 | 8/2016 | Batra et al. |
| 2016/0241436 A1 | 8/2016 | Fourie et al. |
| 2016/0254964 A1 | 9/2016 | Benc |
| 2016/0267384 A1 | 9/2016 | Salam et al. |
| 2016/0323319 A1 | 11/2016 | Gourlay et al. |
| 2016/0330076 A1 | 11/2016 | Tiwari et al. |
| 2016/0352566 A1 | 12/2016 | Mekkattuparamban |
| 2016/0380892 A1 | 12/2016 | Mahadevan et al. |
| 2017/0026292 A1 | 1/2017 | Smith et al. |
| 2017/0031800 A1 | 2/2017 | Shani et al. |
| 2017/0031970 A1 | 2/2017 | Burk |
| 2017/0048110 A1 | 2/2017 | Wu et al. |
| 2017/0048126 A1 | 2/2017 | Handige Shankar et al. |
| 2017/0054758 A1 | 2/2017 | Maino et al. |
| 2017/0063599 A1 | 3/2017 | Wu et al. |
| 2017/0093630 A1 | 3/2017 | Foulkes |
| 2017/0093664 A1 | 3/2017 | Lynam et al. |
| 2017/0093750 A1 | 3/2017 | McBride et al. |
| 2017/0093918 A1 | 3/2017 | Banerjee et al. |
| 2017/0102933 A1* | 4/2017 | Vora ............... G06F 8/65 |

(56) References Cited

U.S. PATENT DOCUMENTS

| | | | |
|---|---|---|---|
| 2017/0111259 | A1 | 4/2017 | Wen et al. |
| 2017/0118167 | A1 | 4/2017 | Subramanya et al. |
| 2017/0126740 | A1 | 5/2017 | Bejarano Ardila et al. |
| 2017/0126792 | A1 | 5/2017 | Halpern et al. |
| 2017/0134233 | A1 | 5/2017 | Dong et al. |
| 2017/0155557 | A1* | 6/2017 | Desai .................... H04L 41/147 |
| 2017/0163442 | A1 | 6/2017 | Shen et al. |
| 2017/0187577 | A1 | 6/2017 | Nevrekar et al. |
| 2017/0195187 | A1 | 7/2017 | Bennett et al. |
| 2017/0206129 | A1 | 7/2017 | Yankilevich et al. |
| 2017/0222873 | A1 | 8/2017 | Lee et al. |
| 2017/0353355 | A1 | 12/2017 | Danait et al. |
| 2018/0069754 | A1 | 3/2018 | Dasu et al. |
| 2018/0077189 | A1* | 3/2018 | Doppke ............. H04L 63/1433 |
| 2018/0167294 | A1 | 6/2018 | Gupta et al. |
| 2019/0173736 | A1* | 6/2019 | Ponnuswamy ..... H04L 41/0631 |
| 2019/0222597 | A1* | 7/2019 | Crabtree ............... H04L 43/045 |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | WO 2016/161127 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Jain, Praveen, et al., "In-Line Distributed and Stateful Security Policies for Applications in a Network Environment," Cisco Systems, Inc., Aug. 16, 2016, 13 pages.
Maldonado-Lopez, Ferney, et al., "Detection and prevention of firewall—rule conflicts on software-defined networking," 2015 7th International Workshop on Reliable Networks Design and Modeling (RNDM), IEEE, Oct. 5, 2015, pp. 259-265.
Vega, Andres, et al., "Troubleshooting Cisco Application Centric Infrastructure: Analytical problem solving applied to the Policy Driven Data Center," Feb. 15, 2016, 84 pages.
Xia, Wenfeng, et al., "A Survey on Software-Defined Networking," IEEE Communications Surveys and Tutorials, Mar. 16, 2015, pp. 27-51.
Akella, Aditya, et al., "A Highly Available Software Defined Fabric," HotNets—XIII, Oct. 27-28, 2014, Los Angeles, CA, USA, Copyright 2014, ACM, pp. 1-7.
Alsheikh, Mohammad Abu, et al., "Machine Learning in Wireless Sensor Networks: Algorithms, Strategies, and Application," Mar. 19, 2015, pp. 1-23.
Author Unknown, "Aids to Pro-active Management of Distributed Resources through Dynamic Fault-Localization and Availability Prognosis," FaultLocalization-TR01-CADlab, May 2006, pp. 1-9.
Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.
Cisco Systems, Inc., "Cisco Application Centric Infrastructure 9AC1 Endpoint Groups (EPG) Usange and Design," White Paper, May 2014, pp. 1-14.
Cisco, "Verify Contracts and Rules in the ACI Fabric," Cisco, Updated Aug. 19, 2016, Document ID: 119023, pp. 1-20.
De Silva et al., "Network-wide Security Analysis," Semantic Scholar, Oct. 25, 2011, pp. 1-11.
Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.
Fayaz, Seyed K., et al., "Efficient Network Reachability Analysis using a Succinct Control Plane Representation," 2016, ratul.org, pp. 1-16.
Feldmann, Anja, et al., "IP Network Configuration for Intradomain Traffic Engineering," Semantic Scholar, accessed on Jul. 20, 2017, pp. 1-27.
Han, Wonkyu, et al., "LPM: Layered Policy Management for Software-Defined Networks," Mar. 8, 2016, pp. 1-8.
Han, Yoonseon, et al., "An Intent-based Network Virtualization Platform for SDN," 2016 I FIP, pp. 1-6.
Kazemian, Peyman, et al., "Real Time Network Policy Checking using Header Space Analysis," USENIX Association, 10th USENIX Symposium on Networked Systems Design and Implementation (NSDI '13) pp. 99-111.
Khatkar, Pankaj Kumar, "Firewall Rule Set Analysis and Visualization, a Thesis Presented in Partial Fulfillment of the Requirements for the Degree Master of Science," Arizona State University, Dec. 2014, pp. 1-58.
Le, Franck, et al., "Minerals: Using Data Mining to Detect Router Misconfigurations," CyLab, Carnegie Mellon University, CMU-CyLab-06-008, May 23, 2006, pp. 1-14.
Liang, Chieh-Jan Mike, et al., "SIFT: Building an Internet of Safe Things," Microsoft, IPSN' 15, Apr. 1416, 2015, Seattle, WA, ACM 978, pp. 1-12.
Lindem, A., et al., "Network Device YANG Organizational Model draft-rtgyangdt-rtgwg-device-model-01," Network Working Group, Internet—draft, Sep. 21, 2015, pp. 1-33.
Liu, Jason, et al., "A Real-Time Network Simulation Infrastructure Based on Open VPN," Journal of Systems and Software, Aug. 4, 2008, pp. 1-45.
Lopes, Nuno P., et al., "Automatically verifying reachability and well-formedness in P4 Networks," Microsoft, accessed on Jul. 18, 2017, pp. 1-13.
Mai, Haohui, et al., "Debugging the Data Plane with Anteater," SIGCOMM11, Aug. 15-19, 2011, pp. 1-12.
Miller, Nancy, et al., "Collecting Network Status Information for Network-Aware Applications," INFOCOM 2000, pp. 1-10.
Miranda, Joao Sales Henriques, "Fault Isolation in Software Defined Networks," www.gsd.inescid.pt, pp. 1-10.
Moon, Daekyeong, et al., "Bridging the Software/Hardware Forwarding Divide," Berkeley.edu, Dec. 18, 2010, pp. 1-15.
Panda, Aurojit, et al., "SCL: Simplifying Distributed SDN Control Planes," people.eecs.berkeley.edu, Mar. 2017, pp. 1-17.
Shin, Seugwon, et al., "FRESCO: Modular Composable Security Services for Software-Defined Networks," to appear in the ISOC Network and Distributed System Security Symposium, Feb. 2013, pp. 1-16.
Shukla, Apoorv, et al., "Towards meticulous data plane monitoring," kaust.edu.sa, access on Aug. 1, 2017, pp. 1-2.
Tang, Yongning, et al., "Automatic belief network modeling via policy inference for SDN fault localization," Journal of Internet Services and Applications, 2016, pp. 1-13.
Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.
Tongaonkar, Alok, et al., "Inferring Higher Level Policies from Firewall Rules," Proceedings of the 21st Large Installation System Administration Conference (LISA '07), Nov. 11-16, 2007, pp. 1-14.
Yu et al., "A Flexible Framework for Wireless-Based Intelligent Sensor with Reconfigurability, Dynamic adding, and Web interface," Conference Paper, Jul. 24, 2006, IEEE 2006, pp. 1-7.
Zhou, Shijie, et al., "High-Performance Packet Classification on GPU," 2014 IEEE, pp. 1-6.

* cited by examiner

| Dashboard | Change Management ▾ | Verify & Diagnose ▾ | Optimize ▾ | Compliance & Audit ▾ | Smart Events | | MAR 10:10 AM |
|---|---|---|---|---|---|---|---|
| | | | | | | | 15 PDT |
| | | | | | ⊗ ⚠ ◆ ⊙ ⊙ | × | Reset |

▽ [Tenant: uni/tn-common ×] Add Filters

| Severity ▿1 | Event Subcategory | Event Name ▵2 | Count | Event Description |
|---|---|---|---|---|
| | Search | Search | | |
| ▵ᵇ | FORWARDING_POLICY | APP_EPG_NOT_DEPLOYED | 47 | The application EPG did not get deployed. |
| ⚠ | FORWARDING_POLICY | BD_WITH_SUBNET_MARKED_EXTERNAL_HAS_L3OU... | 21 | VRF is in enforced mode and BD subnet is advertised externally via an L3Out but the EPG(s) belonging to the BD do not have any contract with the External EPG belonging to the L3Out. —516 |
| ⚠ | FORWARDING_POLICY | BRIDGE_DOMAIN_HAS_INVALID_VRF | 24 | The Bridge Domain has a VRF assigned that does not exist. |
| ⚠ | SECURITY_POLICY | CONSUMER_EPG_HAS_INVALID_CONTRACT | 22 | Consumer EPG is assigned to a contract that may have been deleted. |
| ⚠ | FORWARDING_POLICY | EPG_HAS_INVALID_BD | 35 | The EPG is associated to a BD that no longer exists. This BD may have been deleted. |
| ⚠ | FORWARDING_POLICY | EXTERNAL_BRIDGED_NETWORK_EXT_EPG_NOT_DE... | 46 | The L2Out is configured with an External EPG, but the EPG will not be deployed on the switch. |
| ⚠ | FORWARDING_POLICY | EXTERNAL_ROUTED_NETWORK_EXT_EPG_NOT_DEP... | 8 | L3Out is configured with an External EPG, but the EPG will not be deployed on the leaf. |
| ⚠ | SECURITY_POLICY | PERMIT_POLICY_SHADOWED_BY_DENY_POLICY | 1 | EPGs cannot communicate due to a deny rule overriding a permit rule. |
| ⚠ | SECURITY_POLICY | PROVIDER_EPG_HAS_INVALID_CONTRACT | 18 | Provider EPG has one or more invalid contracts associated to it. |

△ FORWARDING_POLICY BRIDGE_DOMAIN_HAS_INVALID_VRF The Bridge Domain has a VRF assigned that does not exist. ✱

△ FORWARDING_POLICY BRIDGE_DOMAIN_HAS_INVALID_VRF The Bridge Domain has a VRF assigned that does not exist. ✱

△ FORWARDING_POLICY BRIDGE_DOMAIN_HAS_INVALID_VRF The Bridge Domain has a VRF assigned that does not exist. ✱
510─┘        508─┘                 512─┘                                                                    516─┐

| | |
|---|---|
| Description | The Bridge Domain has a VRF assigned that does not exist. |
| Impact | EPGs associated to this BD will not be deployed. |
| Affected objects | The Bridge Domain has invalid VRF: <table><tr><th>BD</th><th>Invalid VRF</th><th>Tenant</th></tr><tr><td>CommonDJBDP57</td><td>CTXP57</td><td>common</td></tr></table> |
| Checks | <table><tr><th>Failing Condition</th><th>Suggested Next Steps</th></tr><tr><td>The VRF assigned to the Bridge Domain does not exist.</td><td>1. Determine if this BD is required. If it is not required, determine if it can be deleted.<br>2. If this BD is required, assign a valid VRF to this BD.</td></tr></table> |
| Event ID/Code | <table><tr><th>Event ID</th><th>Code</th></tr><tr><td>0860fc2e-3c42-39bf-8830-469405c72cbc-7fbfd919c0ec242fe8dc38a6b2037e25</td><td>3020</td></tr></table> |

518┘ 520┘ 522┘ 526┘ 524┘ 530┘ 528┘

△ BRIDGE_DOMAIN_HAS_INVALID_VRF The Bridge Domain has a VRF assigned that does not exist.

△ BRIDGE_DOMAIN_HAS_INVALID_VRF The Bridge Domain has a VRF assigned that does not exist.

Dashboard  Change Management ▾  Verify & Diagnose ▾  Optimize ▾  Compliance & Audit ▾  Smart Events ▽ Subcategory: ENDPOINT_LEARNING ×  Add Filters

| Severity ▾ | MAC 712 | IP 714 | EPG 716 | BD 718 | VRF 720 | Encap 722 | Interface | Leafs |
|---|---|---|---|---|---|---|---|---|
| Search | Search | Search | Search | Search | Search | Search | Search 724 | Search 726 |
| ⊗ | 00:50:56:81:D0:28 | | VIRTUAL-FW-NOPBRc.... | BD-Client | CTX1 | 2342 | eth1/31 | candid2-leaf; |

Events by severity 728

| Critical | Major | Minor | Warning | Info |
|---|---|---|---|---|
| 1 | 0 | 0 | 0 | 0 |

Learning Status 730

| Node | Interface | Encap | Anycast | Is Router | Is Host | Is VPC | Is Static | Is Infra |
|---|---|---|---|---|---|---|---|---|
| candid2-leaf2 | eth1/31 | 2342 | no | no | - | no | no | - |
| candid2-spine2 | | | no | no | - | no | no | - |

Raw JSON data  ▶ Object: (ep_key: 6533185070180605881_00:50:56:81:D0:28_14745654, type:

| ⊗ | 00:50:56:81:DC:B8 | 21.1.1.20 | VIRTUAL-FW-NOPBRc.... | BD-Web | CTX1 | 2341 | eth1/31 | candid2-leaf; |
| ⊗ | 00:50:56:81:22:C6 | 31.1.1.10 | VIRTUAL-FWctxCTX1-... | BD-ASA-Int | CTX1 | 2003 | eth1/31 | candid2-leaf; |
| ⊗ | 00:50:56:81:E8:89 | 41.1.1.20 | VIRTUAL-FWctxCTX1-... | BD-ASA-Ext | CTX1 | 2339 | eth1/31 | candid2-leaf; |

EPOCH DATA INTERFACE

TECHNICAL FIELD

The present technology pertains to network configuration and troubleshooting, and more specifically to an interface that enables quick network configuration and troubleshooting.

BACKGROUND

Computer networks are becoming increasingly complex, often involving low level as well as high level configurations at various layers of the network. For example, computer networks generally include numerous access policies, forwarding policies, routing policies, security policies, etc., which together define the overall behavior and operation of the network. Network operators have a wide array of configuration options for tailoring the network to the needs of the users. While the different configuration options available provide network operators a great degree of flexibility and control over the network, they also add to the complexity of the network. In many cases, the configuration process can become highly complex. Not surprisingly, the network configuration process is increasingly error prone. In addition, troubleshooting errors in a highly complex network can be extremely difficult. The process of understanding the network configurations and topology in a large network, and identifying the root cause of undesired behavior can be a daunting task.

Moreover, the amount of data relating to the network can be prohibitively large, increasing exponentially with time. For example, some services and/or systems generate a large amount of time-based data (e.g., a large set of data for each of several time periods) in over to track the configuration and health of a network fabric over time. However, it is difficult for users to get a good overall view of the voluminous data, insight into particular epochs of interest, and/or quickly select sets of data to investigate.

There is therefore a need to address the above problems for services and/or systems that generate large amounts of time-based data.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 5A shows an example user interface in accordance with some aspects of the present technology;

FIG. 5B shows an example user interface in accordance with some aspects of the present technology;

FIG. 7 shows an example user interface in accordance with some aspects of the present technology;

DESCRIPTION OF EXAMPLE EMBODIMENTS

Figure 1A:
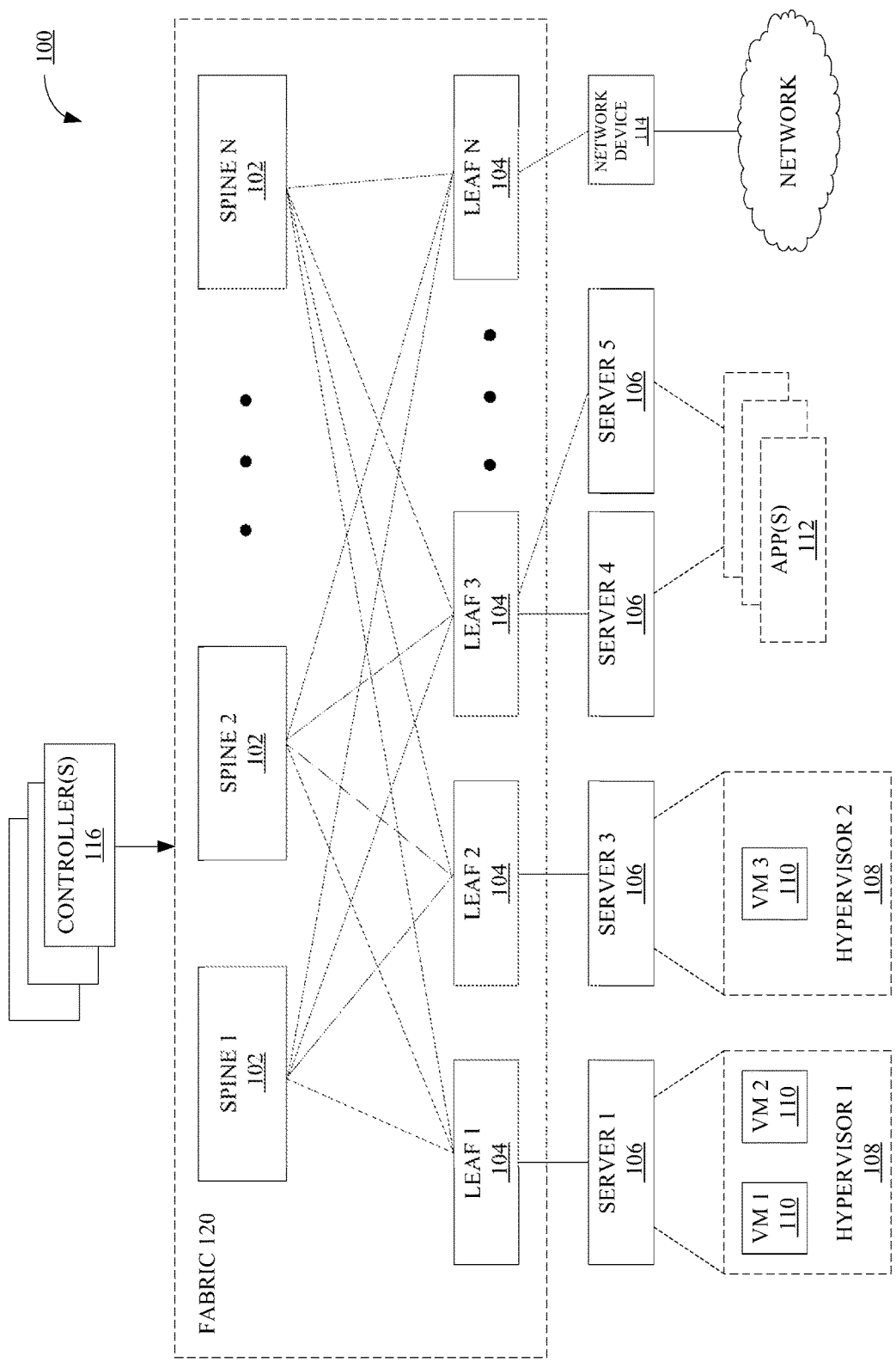
FIG. 1A illustrates an example network environment in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview:

Systems, methods, and devices are disclosed for generating an interface configured to display status information for network elements on a network. In embodiments, one or more logical models of the network are obtained from at least one of a plurality of controllers on a network. Network statistics are determined based on network traffic. Based on the one or more logical models and the network statistics, a topology of the network and respective status information of one or more network elements during an epoch is identified, the epoch defining a time interval. A user interface is generated that displays the respective status information in a timeline comprising one or more of the epochs.

EXAMPLE EMBODIMENTS

The disclosed technology addresses the need in the art for providing an interface that enables quick network configuration and troubleshooting. It brings formal verification techniques into networking by mathematically verifying and validating an entire network for correctness, giving operators of a network the confidence that their network is always operating consistently with their intent, even as it changes dynamically. For example, data that's been collected from devices on a network can provide valuable details about the status, security, or performance of the network, as well as any network elements. This collected data can be analyzed to monitor and troubleshoot the network. As network environments increase in size and complexity, a large amount of data is collected and generated in monitoring the network environments. Unfortunately, larger amounts of data generated for network environments make it more difficult to analyze the data and subsequently monitor network environments to determine anomalies in the network environments. Moreover, as states of network environments change after an anomaly occurs, often before an administrator can determine a network state of the environment at the time of the anomaly, it can be difficult for administrators to correctly diagnose and fix problems in the network environments The disclosed embodiments provide an interface that enables users to quickly see problems in the network and, in some embodiments, provides troubleshooting or remediation suggestions. This can be especially useful for networks that are dynamic, distributed systems whose states change over time. The present technology accomplishes this by obtaining, one or more logical models of a network from at least one controller on the network. The logical models include configurations of one or more objects defined for the network. The objects can be hardware and/or logical constructs like endpoint groups (EPGs), contracts, application profiles, etc. Network statistics are measured based on network traffic. Based on the logical models and the measured network statistics, a topology of the network and respective status information of one or more network elements is identified during an epoch, the epoch defining a certain time interval. The network elements can include configured objects as well as components/devices in the network/fabric, and any other network item. A user interface is then generated that displays the respective status information of the network elements in a timeline comprising one or more of the epochs.

For example, a user or interface on a client device may define a set of epochs for viewing. Data during the set of epochs relating to objects on the network and/or the entire network state can be collected and/or received by the system. The system can retrieve the data generated or collected during each epoch in the set of epochs, and the system can then generate a status of the network fabric for each epoch based on the epoch's associated data. The system can transmit the status information for each epoch in the set of epochs to the interface for display in a timeline where each epoch is represented by an icon (which can vary based on the status for the epoch, such as whether the epoch collection was completed, completed with issues, not successful, etc.).

A user may quickly see the order of epochs in the timeline to gain an overall view of the data generated by the system. Furthermore, the different icons for each epoch helps a user quickly identify problem epochs for further investigation by highlighting particular epochs of interest for a user within an overall view of the epoch based data. The user may select epochs of interest in order to view more information associated with the selected epoch, and allows the user to quickly manipulate data by epoch in order to locate more precisely desired epoch based data, such as information about a topology of the network and respective status information of a network element.

The present technology involves system, methods, and computer-readable media for detecting and reporting anomalies in a network environment in providing network assurance. A user interface can be generated that that assists troubleshooting and/or provides remedial suggestions in association with network assurance. Network assurance is the guarantee or determination that the network is behaving as intended by the network operator and has been configured properly (e.g., the network is doing what is intended, from system wide to individual network elements (e.g., switches, routers, applications, resources, etc.)). However, often times, the configurations, policies, etc., defined by a network operator are not accurately reflected in the actual behavior of the network. For example, a network operator can specify a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator can implement configuration C, but one or more other configurations result in the network behaving in a manner that is inconsistent with the intent reflected by the implementation of configuration C.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a VXLAN or software-defined network (SDN) (e.g., Application Centric Infrastructure (ACI) or VMware NSX networks); etc.

Logical models of a network can be constructed and implemented for network assurance. A logical model can provide a representation of one or more aspects of a network, including, without limitation the network's policies, configurations, requirements, security, routing, topology, applications, hardware, filters, contracts, access control lists, infrastructure, etc. Different types of models can be generated for a given network.

Such logical models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through logical modeling without necessarily ingesting packet data or monitoring traffic or network behavior. This can result in foresight, insight, and hindsight: problems can be prevented before they occur, identified when they occur, and fixed immediately after they occur.

Thus, network assurance can involve logical modeling of properties of the network to deterministically predict the behavior of the network. The network can be determined to be healthy if the logical model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the logical modeling, a detailed analysis of the corresponding model(s) can allow one or more underlying or root problems to be identified with great accuracy. This detailed analysis, split up by one or more epochs, can be included in a generated display that allows highlights epochs of interest to a user. Moreover, the generated display can provide remedial suggestions or other troubleshooting advice in response that is tailored to the epochs of interest.

Having described various aspects of network assurance, the disclosure now turns to a discussion of example network environments for network assurance.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 1B:
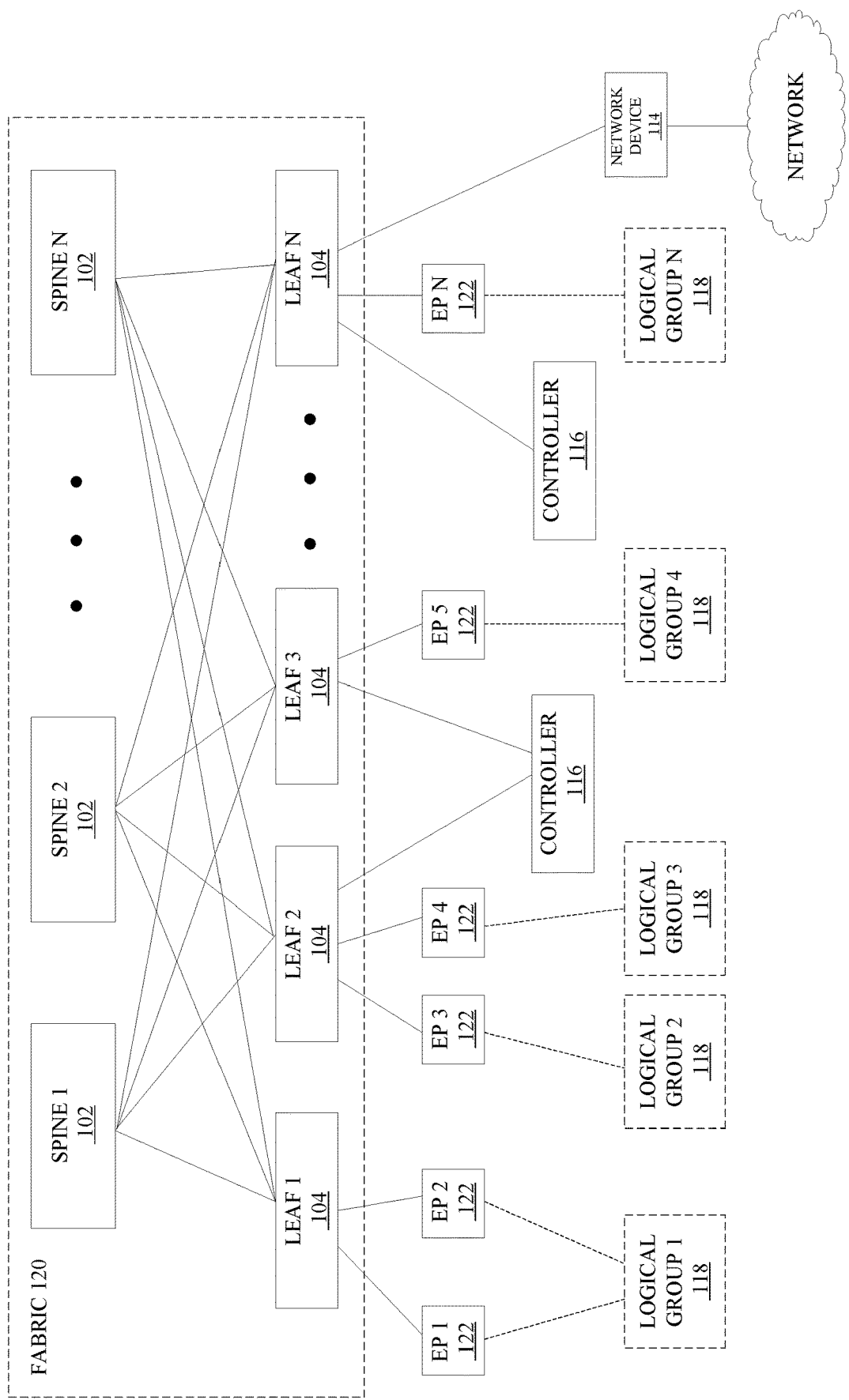
FIG. 1B illustrates an example network environment in accordance with some aspects of the present technology.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 2:
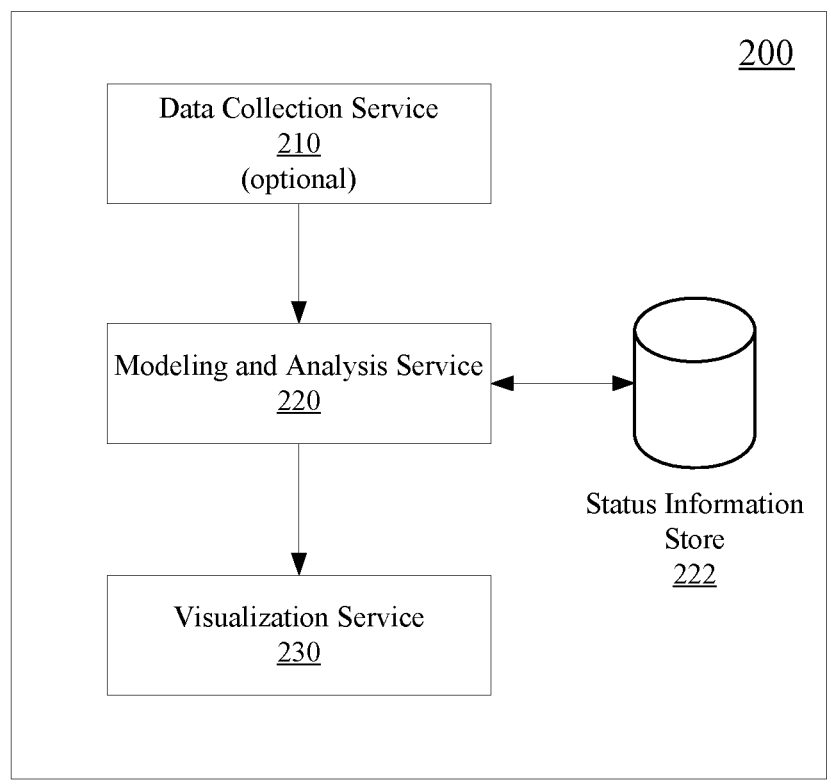
FIG. 2 shows an example network compliance and verification system in accordance with some aspects of the present technology.
Figure 3:
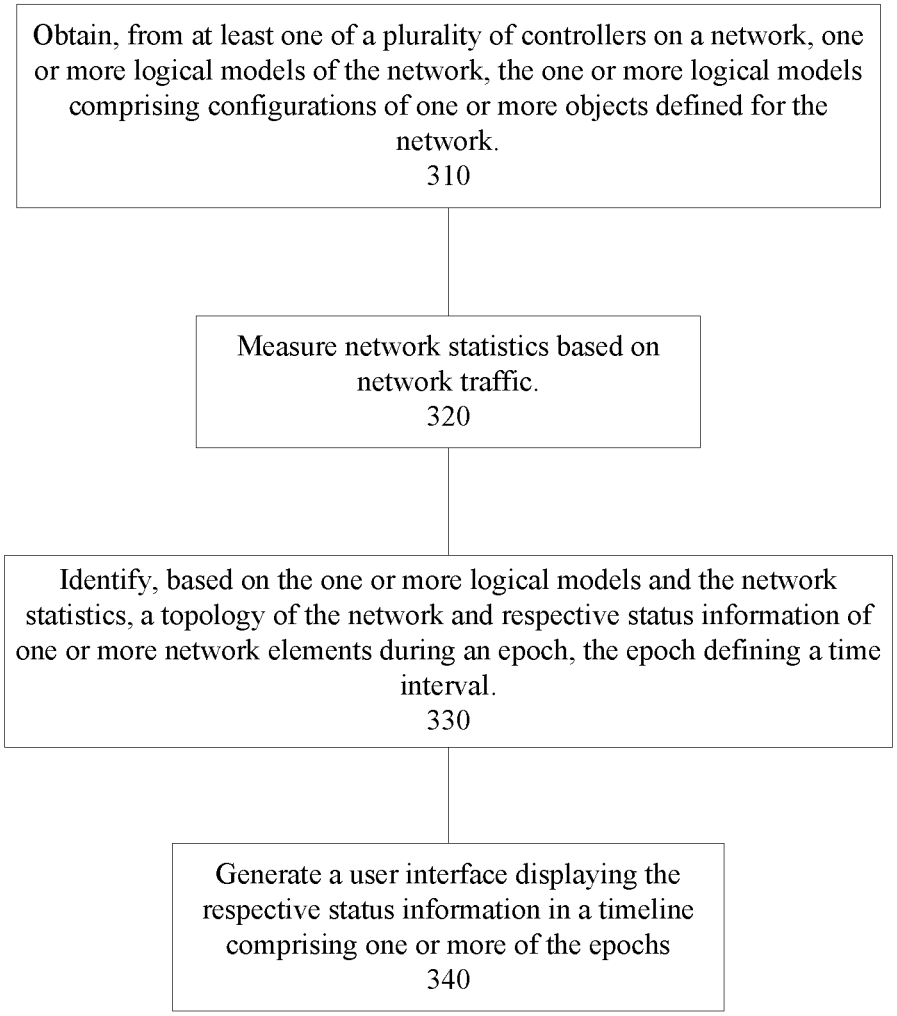
FIG. 3 is a flow chart illustrating an example embodiment of a network compliance and verification service in accordance with some aspects of the present technology.

FIG. 2 shows an example network compliance and verification system, used with an example methodology illustrated as a flow chart in FIG. 3, in accordance with some aspects of the present technology.

System 200 can include data collection service 210 as part of an example network assurance method. Data collection service 210 can collect data associated with Network Environment 100. The data can include fabric data (e.g., topology, switch, interface policies, application policies, EPGs, etc.), network configurations (e.g., BDs, VRFs, L2 Outs, L3 Outs, protocol configurations, etc.), security configurations (e.g., contracts, filters, etc.), service chaining configurations, routing configurations, and so forth. Other information collected or obtained can include, for example, network data (e.g., RIB/FIB, VLAN, MAC, ISIS, DB, BGP, OSPF, ARP, VPC, LLDP, MTU, QoS, etc.), rules and tables (e.g., TCAM rules, ECMP tables, etc.), endpoint dynamics (e.g., EPM, COOP EP DB, etc.), statistics (e.g., TCAM rule hits, interface counters, bandwidth, etc.).

System 200 can include modelling and analysis service 220, which can generate logical models and analyze received data in accordance with the logical models. The logical models can be obtained from at least one controller on the network, and can include configurations, policies, etc., of one or more objects defined for the network, as described below with reference to step 310 of FIG. 3.

For example, modelling and analysis service 220 can perform comprehensive network modelling by building mathematically accurate representations of network behavior spanning underlay, overlay, and/or virtualization layers (e.g., logical models). The logical models can provide representations of the network's intended behavior based on the specification and/or configuration of the network (e.g., the network intent reflected by the configurations specified by the network operator via one or more controllers on the network), but may also include representations of the network's actual behavior based on real-time state, traffic, policy, etc. For instance, modelling and analysis service 220 can obtain and/or anaylyze a model of network-wide and/or node-specific (e.g., switch, endpoint, etc.) contracts, the forwarding state at one or more network devices, configurations of one or more network devices (e.g., switches, endpoints, etc.), and so on. Modelling and analysis service 220 can obtain and/or analyze logical models that model multiple aspects of the network, including, but not limited to: endpoint mobility, network security, tenant and/or service policies, resources utilization, forwarding, tenant resources and/or policies, etc. Modelling and analysis service 220 can capture, analyze, and correlate network state, including switch configurations and data-plane state at the hardware level. The analysis can span multiple aspects of the network such as network behavior, controller policy, contracts, forwarding state, virtual machine configurations and mobility, utilization of hardware resources such as TCAM, application profiles and behavior, EPGs, ACLs, filters, etc.

To illustrate, let's look at one example: analyzing tenant security. For example, modelling and analysis service 220 can read all the security contracts and the enforcement policies configured in software for one or more tenants and rendered in hardware (e.g., TCAM). These policies are translated into an optimized representation of these policies and mathematically verified or validated. Using this model, and assuming A and B are objects on the network, modelling and analysis service 220 can analyze the configurations defined for the network and the rules rendered on hardware to answer several questions, such as: (1) who can A talk to?; (2) can A talk to B?; (3) is there isolation between tenants?; (4) are any policies conflicting with each other?; (5) are some policies aliased?; (6) did an upgrade to a new software and/or hardware version change existing security or policy enforcement or network behavior?; (7) are the configured policies compliant?; (8) which specific policy has been violated?; etc. A similar approach can be used for all other aspects of the network, e.g., collect the data, build the model, and run an exhaustive set of checks against it.

The analysis can run continuously: every few minutes the entire policy and network state can be polled, which can update the formal model. Modelling and analysis service 220 can then run the checks against it. When a discrepancy is found, modelling and analysis service can generate a "smart event," which pinpoints deviations from intended behavior and provides expert-level remediation suggestions.

In some embodiments, modelling and analysis service 220 can generate one or more smart events. Modelling and analysis service 220 can generate smart events using deep object hierarchy for detailed analysis, such as Tenants, switches, VRFs, rules, filters, routes, prefixes, ports, contracts, subjects, etc.

Modelling and analysis service 220 can measure network statistics based on network traffic (step 320), and store the network statistics in status information store 222. The data from data collection service 210, for example, can be analyzed to measure and/or capture network-wide device state and configurations, controller policy, and/or operator intent. For example, the network statistics can be measured based on the logical models, which can involve determining equivalency between the logical models and the objects defined for the network, such as the configurations, policies, etc.

Modelling and analysis service 220 can identify, based on the one or more logical models and the network statistics, a topology of the network and status information of one or more network elements (step 330). The topology of the network and status information can be collected during an epoch, which defines a time interval, and can be customized by user input. In addition to the epoch, the type(s) of data collected and analyzed can also be customized by user input. For example, the user input can define a metric associated with the type of data, where the logical model determines the respective status based on the metric.

System 200 can also include visualization service 230 that can generate a user interface displaying the status information in a timeline comprising one or more of the epochs (step 340). Visualization service 230 can visualize the smart events, analysis, and/or models. Visualization service 230 can display problems and alerts for analysis and debugging, in a user-friendly GUI.

Visualization service 230 can, for example, classify status information into a type of error, and then aggregate all the objects from the network that are associated with the type of error during the epoch. Visualization service 230 can display the aggregation of the type of error, where the display can include an option to view a number of instances of the type of error that occurred during the epoch. Visualization service 230 can also, after classifying the status as a type of error, determine an action to recommend based on the type of error. Visualization service 230 can provide an option that can display the recommended action.

Visualization service 230 can generate a report based on the status information. The report can include both the type of error and the recommended action, where the report can enable a user to modify at least one of a range of epochs included in the report or a number of instances that are aggregated in the report.

In alternative embodiments, system 200 and data collection service 210 does not collect data themselves, but takes in a file from a possible third party data collection service. In this instance, the data can be received from a collection file associated with a timestamp defining the epoch. Modelling and analysis service 220 can analyze the collection file to identify the status information of the one or more objects from the network during the timestamp, and then determine an action to recommend based on the respective status information. Visualization service 230 can provide an option to display the recommended action.

Figure 4A:
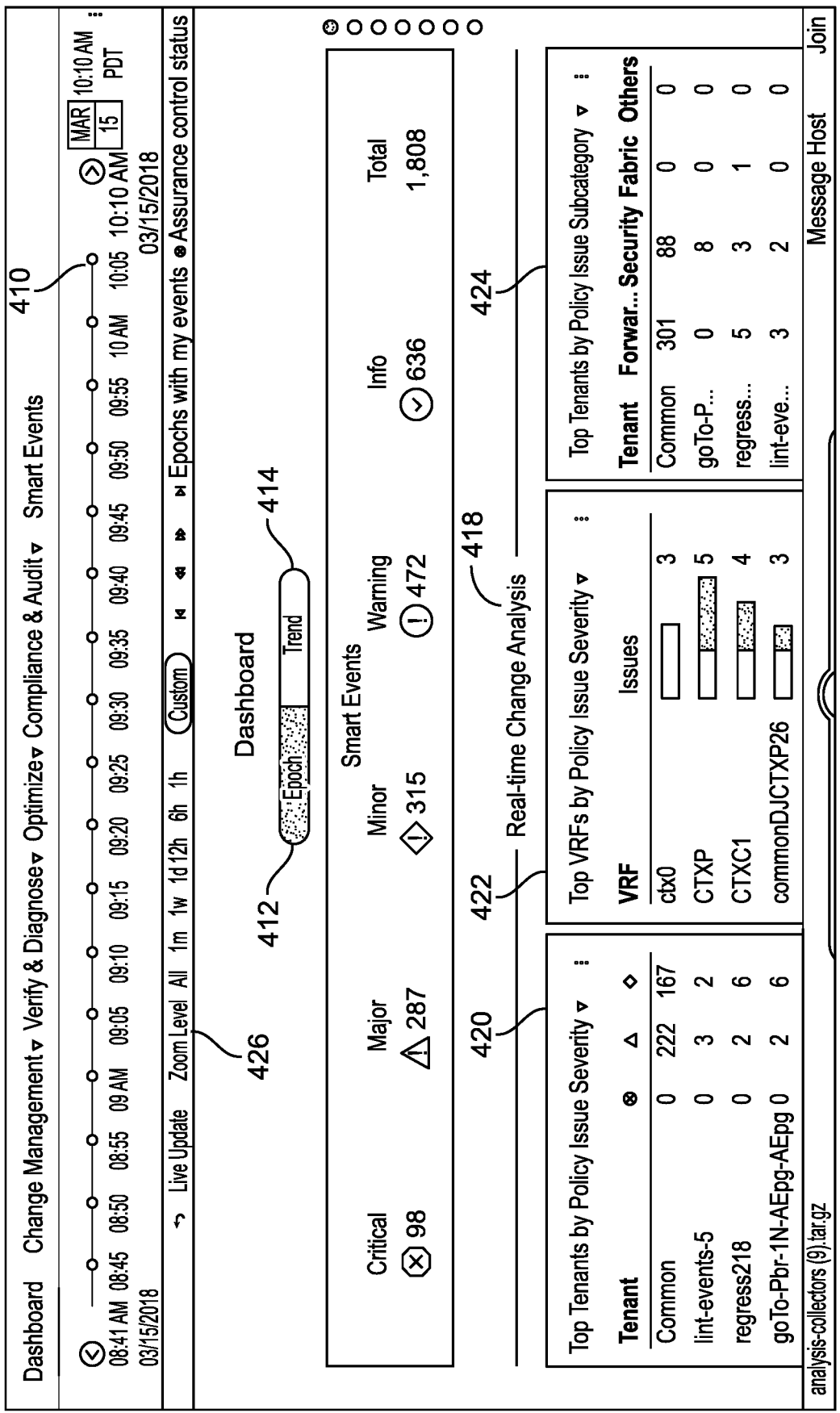
FIG. 4A shows an example user interface in accordance with some aspects of the present technology.

FIG. 4A shows an example user interface displaying the status information, including a timeline comprising one or more of the epochs. Information from each epoch can be displayed, so that a user can quickly glance through and identify problematic areas in the network. The user can then drill down to an area or specific epoch to start to troubleshoot the network.

A dashboard, for example, can display timeline 410, which can display an icon representing each epoch. For example, timeline 410 can display a color icon (e.g., red for critical events/issues) at a certain radius (e.g., representing severity, such as larger radii indicate more serious network issues than smaller radii) across different epochs. For example, the circle size of the icon can represent the number of critical errors at any point in time. Timeline 410 can also span over a time period, such as the time period shown represented by epochs beginning at 8:45 AM and ending at 10:05 AM. In some embodiments, the epochs displayed can be modified through a zoom function, such as zoom level 426. Zoom level 426 can zoom in or out, displaying more or less epochs in timeline 410.

Epochs can be defined by a user based on the timeframe that the user thinks is a data collection interval frequent enough to determine the health of the network/data center. While epochs are customizable, the length of data collection can be customizable by the user as well. For example, the user can define how long the data should be collected and analyzed. If the user does not define an epoch, an epoch can be suggested for an interval (e.g., five to thirteen minutes).

Epoch Dashboard 412 can show consolidated views of how many errors happened for each epoch. For example, the icons in timeline 410 at each epoch can represent an instance for which there are completed reports. Thus, a user can select an icon (e.g., red circle representing an epoch) that brings up associated reports, as well as a list of all the events that were raised at the time of collection. The reports, for example, can be viewed in the interface. Seen here, the reports (e.g., 420, 422, 424) are displayed below timeline 410. Epoch Dashboard 412 can also display a summary of issues during the selected epoch, such as the number of critical, major, and minor network object issues. Epoch Dashboard 412 can also display warnings, and information about network objects, as well as the total number of network objects included in the reports. The Trend Dashboard 414 can display information about multiple epochs, which is discussed in more detail in FIGS. 8-9.

Figure 4B:
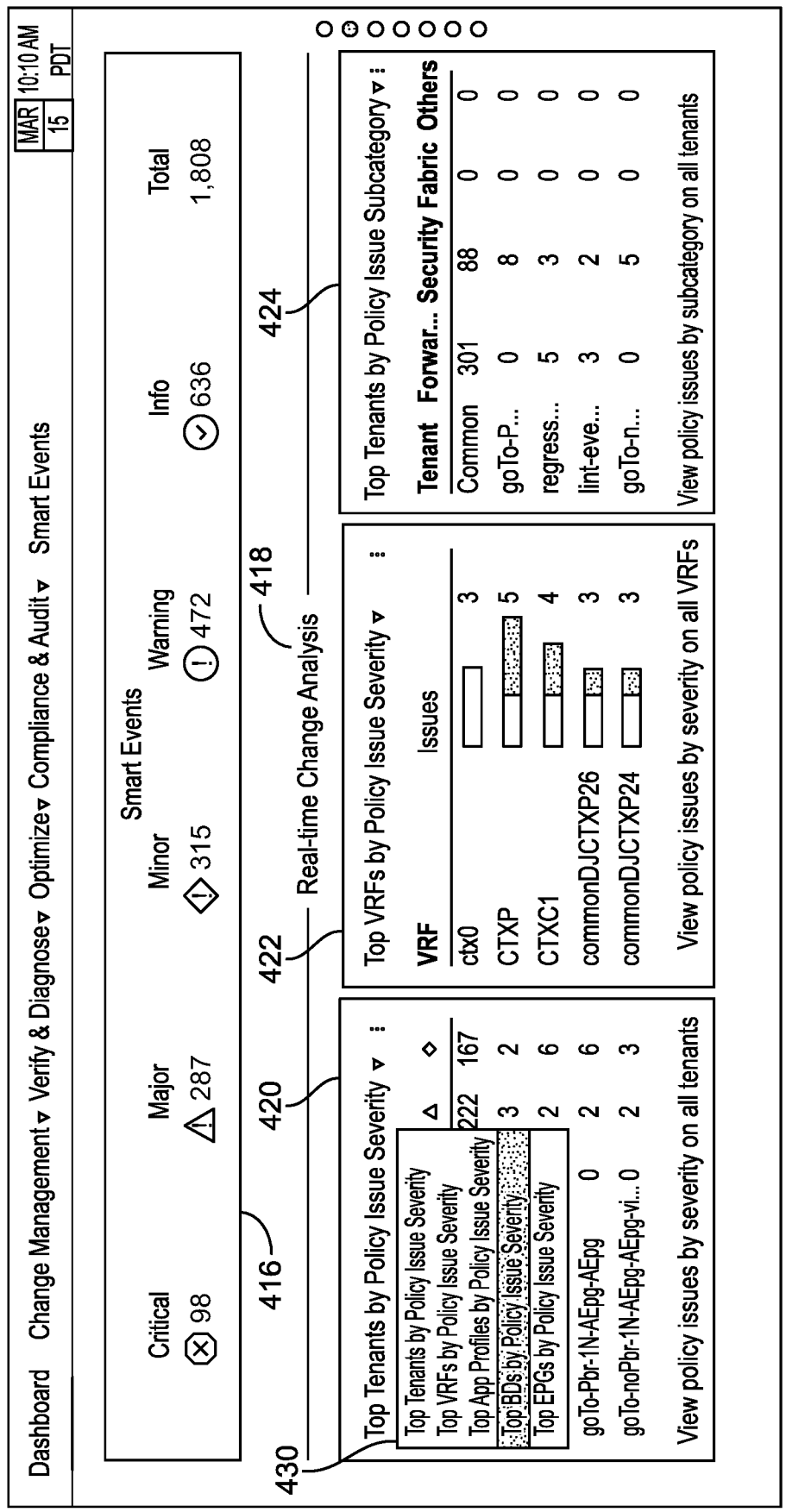
FIG. 4B shows an example user interface in accordance with some aspects of the present technology.

FIG. 4B shows smart events 416, which displays a consolidated view of the errors within the network. Real-time change analysis 418 can show reports related to smart events 416 during a selected epoch or range of epochs. Reports can be, for example, top tenants by policy issue severity 420, and top virtual routing and forwarding instances (VRFs) by issue severity 422. Reports can also be associated with subcategories, such as top tenants by policy issue subcategory 424. Pull down menus 430 can allow a user to change between reports, such as changing from top tenants to top bridge domains (BDs) by policy issue severity.

Users can also drill down into certain types of events, such as all events classified as critical, major, minor, etc. For example, FIG. 5A shows all events with the same severity 510 (e.g., major events), broken down by event subcategory 508, which can classify any number of similar events. Event subcategory 508 can be broken down by the events under the event category, such as event name 512. The user interface can also display the count 514 of event name 512 and the event description 516. For example, the event subcategory 508 can be FORWARDING_POLICY, event name 512 can be BRIDGE_DOMAIN_HAS_INVALID_VRF, the count 514 can be 24 (e.g., 24 instances of the event that occurred during the epoch), and the event description 516 describes the event as "the Bridge Domain has a VRF assigned that does not exist".

The user can further drill down into each event, and suggest recommended actions to remediate the event, such as shown in FIG. 5B. For example, the user can select event name 512, which will display a description 518 of the event, a description of its impact 520 on the network, and a list of affected objects 522. The recommended actions can be displayed in checks 524, which can present a description of the failing condition 526 and suggested next steps 528. An event ID 530 can also be assigned to the event.

Figure 6:
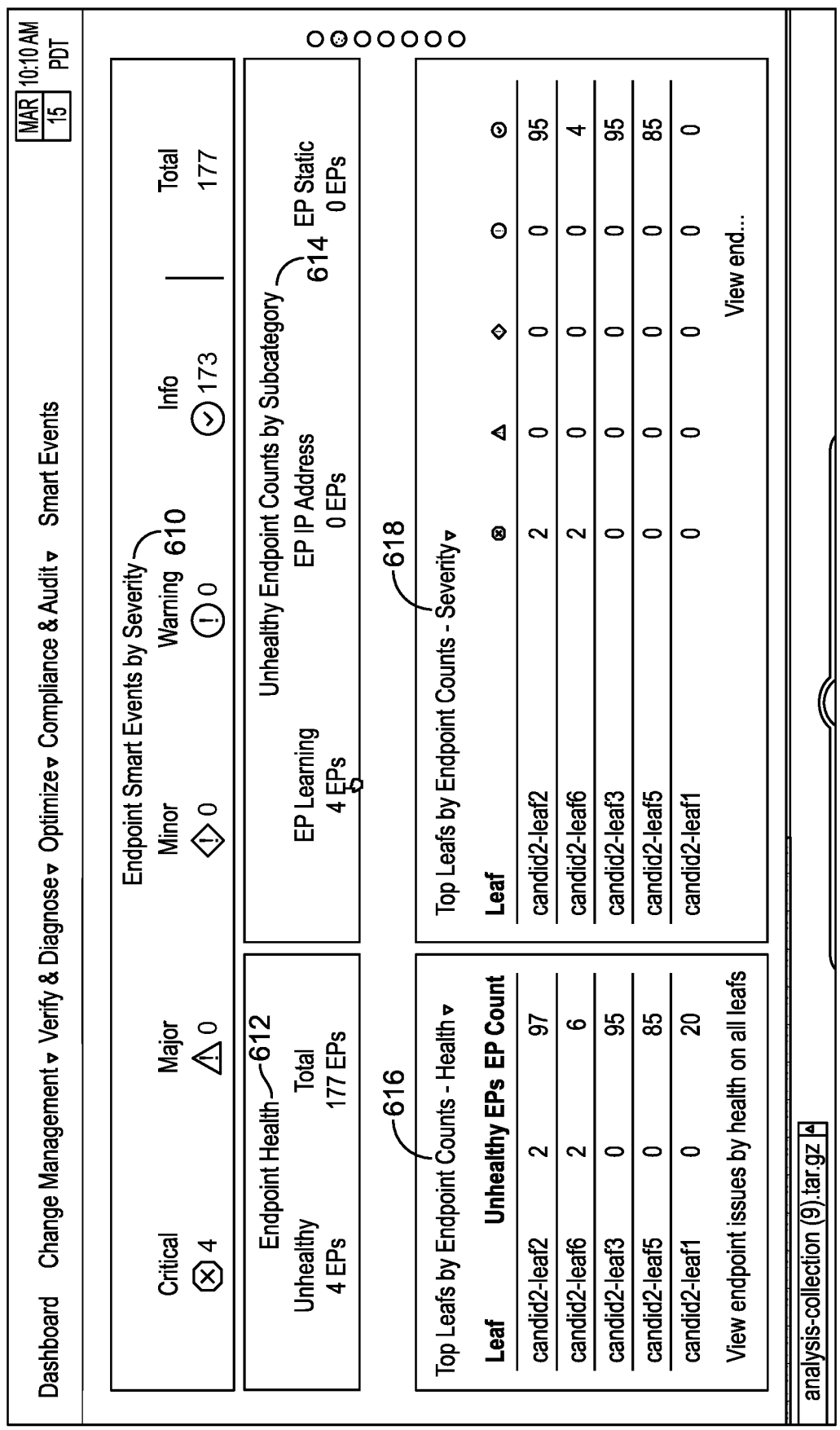
FIG. 6 shows an example user interface in accordance with some aspects of the present technology.

FIG. 6 shows reports associated with an end point. The user interface can display endpoint issues by severity, e.g., endpoint smart events 610. For example, as shown, there are 4 critical errors during the selected epoch. Endpoint health 612 displays how many endpoints need remedial action, which can be further broken down by subcategory (e.g., unhealthy endpoint counts by subcategory 614). Thus, in the example shown, there are 4 unhealthy endpoints in the EP Learning subcategory. The user can determine the number and type of EP learning issues by looking at related reports based on health and/or severity (e.g., 616 and 618, respectively). Thus, looking at a severity report 618 tells a user that there are two critical EP learning issues each on candid2-leaf2 and candid6-leaf6.

Reports can apply any number of filters to the reports, such as shown in FIG. 7. For example, events can be filtered based on subcategory and endpoint learning type, which can display a report that presents the event severity 710, MAC address (MAC 712), IP address (IP 714), endpoint group (EPG 716), bridge domains (BD 718), virtual routing and forwarding instances (VRF 720), encapsulated and/or decapsulated packets (Encap 722), interface 724, and leafs 726. Moreover, the number 728 of events by severity can be displayed, as well as learning status 730.

Figure 8:
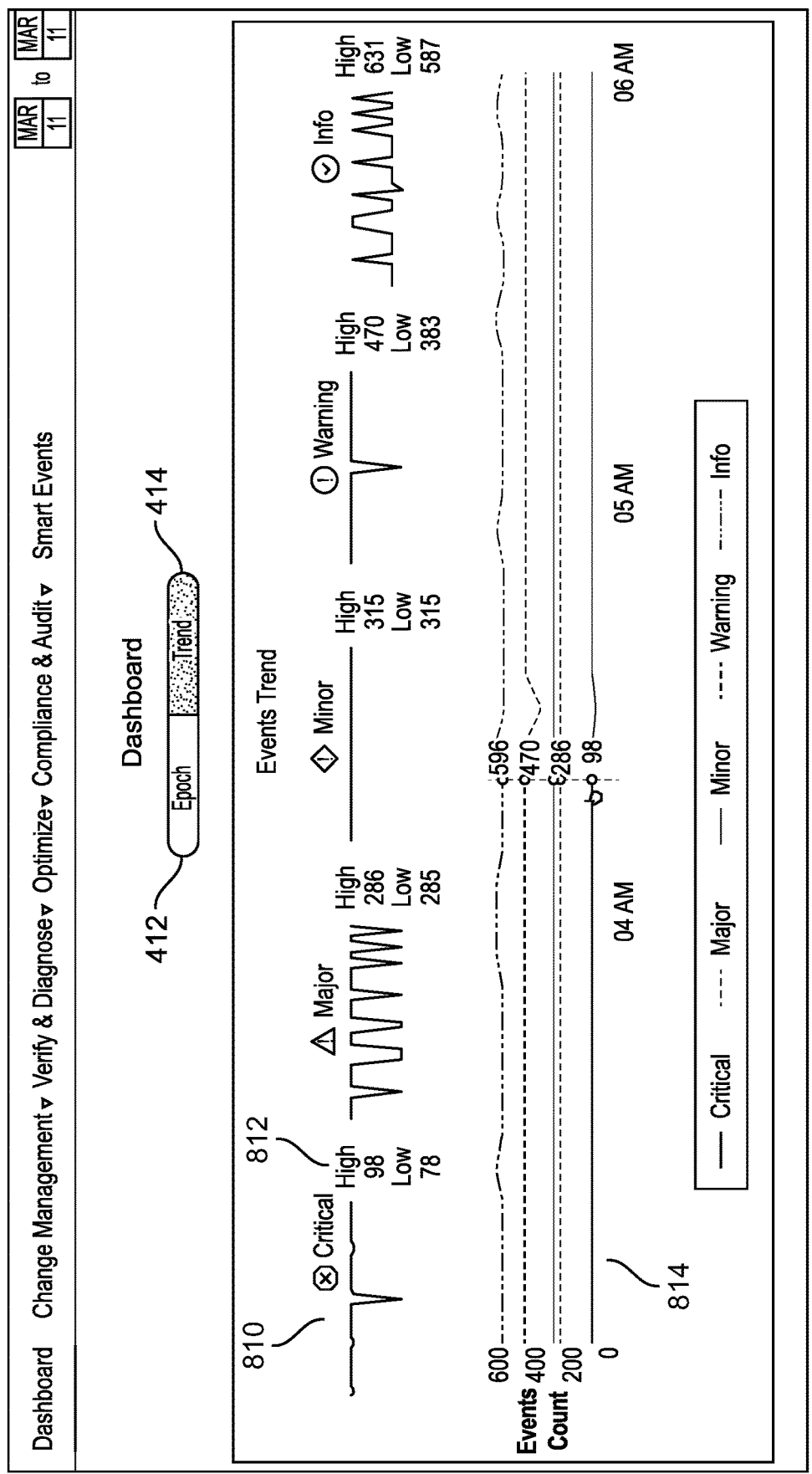
FIG. 8 shows an example user interface in accordance with some aspects of the present technology.

FIG. 8 shows a Trend Dashboard 414, which shows the behavior of network objects, EPGs, or both over time. Trend Dashboard 414 can show plots 810 of the number of a type of event over time. Trend information 812 can be shown as well, such as the highest number of the error type and the lowest number of the error type over the time period shown. Plot 814 can show the event count for different event types over a specific period of time. In this example, plot 814 shows the number of critical, major, minor, warning, and info event type occurences over the time period of 3 AM to 6 AM.

Figure 9:
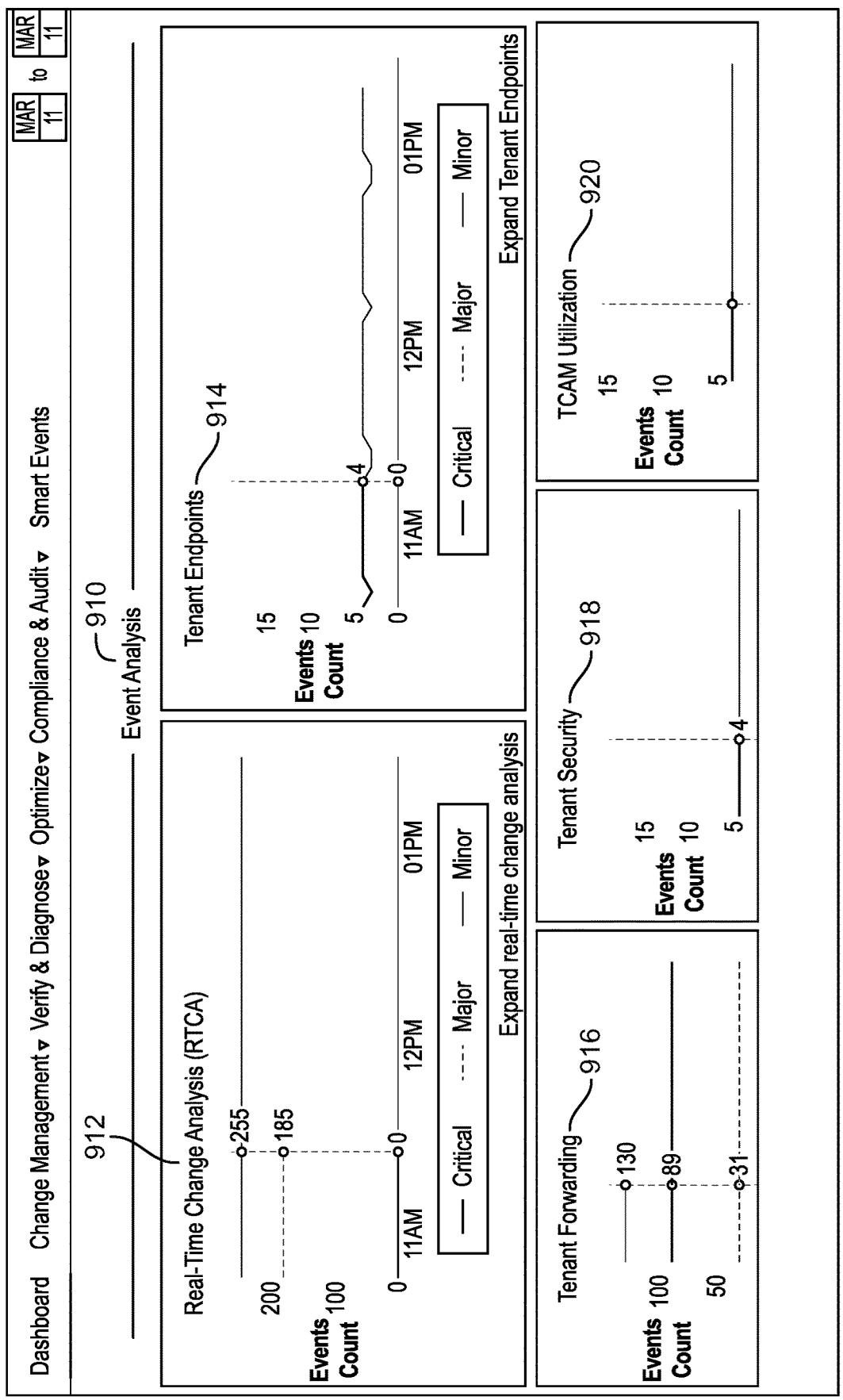
FIG. 9 shows an example user interface in accordance with some aspects of the present technology.

Trend Dashboard 414 can also show reports 910 based on event analysisver time, such as shown in FIG. 9. For example, reports 910 can show, per error type (e.g., critical, major, minor), trends in events, such as real-time change analysis reports 912, tenant endpoint reports 914, tenant forwarding reports 916, tenant security reports 918, and TCAM utilization reports 920.

Figure 10:
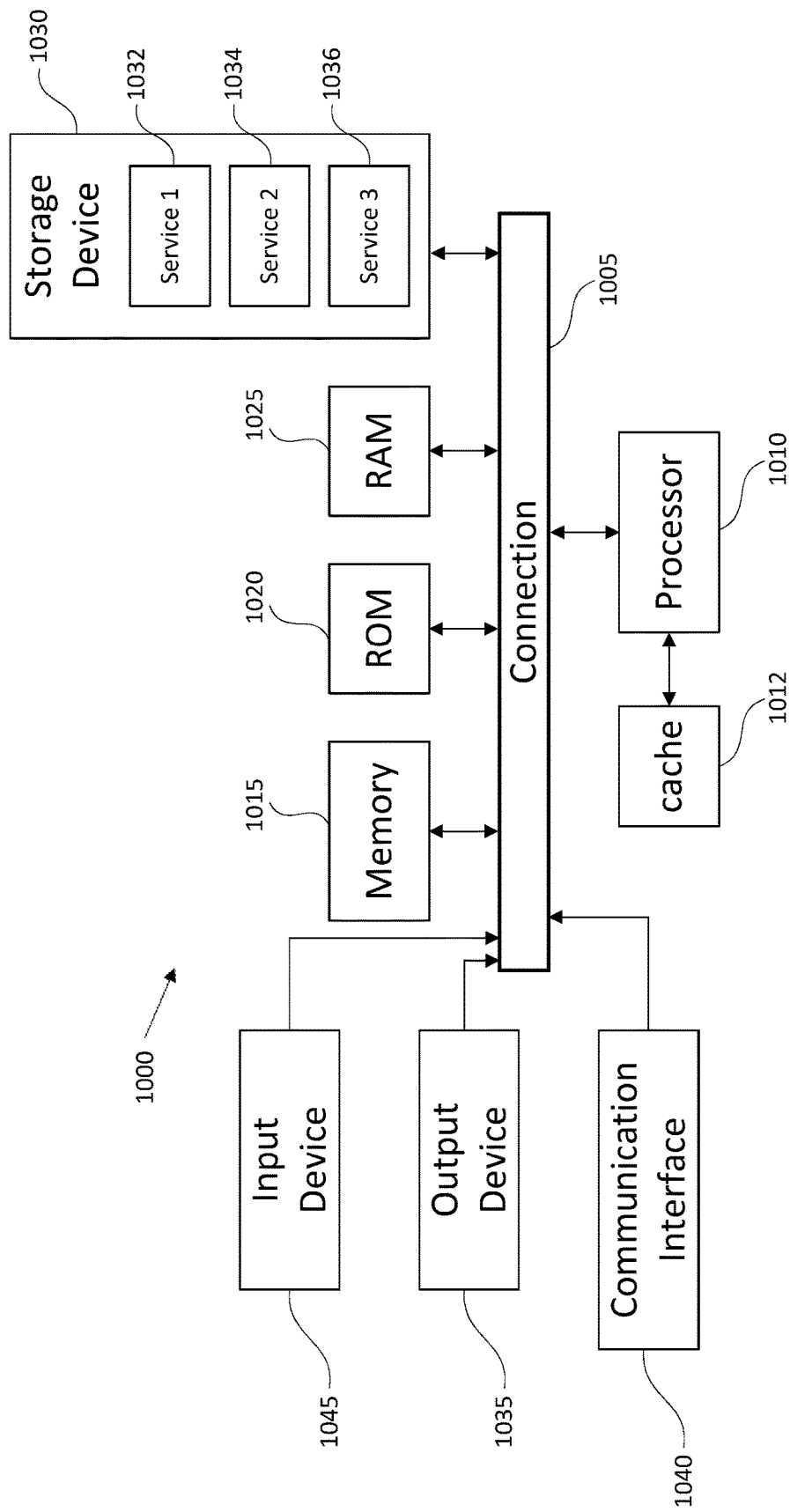
FIG. 10 shows an example of a system for implementing certain aspects of the present technology.

FIG. 10 shows an example of computing system 1000, for use in components illustrated in FIGS. 1-2, and 4A-9, in which the components of the system are in communication with each other with each other using connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read only memory (ROM) and random access memory (RAM) to processor 1010. Computing system 1000 can include a cache of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions stored thereon that, when executed by one or more processors, cause the one or more processors to:
obtain, from at least one of a plurality of controllers on a network, one or more logical models of the network, the one or more logical models comprising configurations of one or more objects defined for the network;
determine network statistics based on network traffic;
identify, based on the one or more logical models and the network statistics, a topology of the network and respective status information of one or more network elements during an epoch, the epoch defining a time interval; and
generate a user interface displaying the respective status information in a timeline comprising one or more of the epochs.

2. The non-transitory computer readable medium of claim 1, wherein the epoch and a type of the data is customized by user input.

3. The non-transitory computer readable medium of claim 2, storing additional instructions which, when executed by the one or more processors, cause the one or more processors to:
receive, from user input, a metric associated with the type of data, wherein the logical model determines the respective status based on the metric.

4. The non-transitory computer readable medium of claim 1, storing additional instructions which, when executed by the one or more processors, cause the one or more processors to:
classify the respective status information into a type of error;
aggregate all objects from the network associated with the type of error; and
display the aggregation of the type of error, wherein the display comprises an option to view a number of instances the type of error occurred during the epoch.

5. The non-transitory computer readable medium of claim 1, storing additional instructions which, when executed by the one or more processors, cause the one or more processors to:
classify the respective status as a type of error;
determine an action to recommend based on the type of error; and
provide an option configured to display the action.

6. The non-transitory computer readable medium of claim 5, storing additional instructions which, when executed by the one or more processors, cause the one or more processors to:
generate a report based on the respective status information, the report comprising the type of error and the recommended action, wherein the report enables a user to modify at least one of a range of epochs included in the report or a number of instances aggregated in the report.

7. The non-transitory computer readable medium of claim 1, wherein the data is received from a collection file associated with a timestamp defining the epoch, the non-transitory computer readable medium storing additional instructions which, when executed by the one or more processors, cause the one or more processors to:
analyze the collection file to identify the respective status information of the one or more objects from the network during the timestamp;
determine an action to recommend based on the respective status information; and
provide an option configured to display the action.

8. A system comprising:
one or more processors; and
at least one computer-readable storage medium having stored therein instructions which, when executed by the one or more processors, cause the system to:
obtain, from at least one of a plurality of controllers on a network, one or more logical models of the network, the one or more logical models comprising configurations of one or more objects defined for the network;
determine network statistics based on network traffic;
identify, based on the one or more logical models and the network statistics, a topology of the network and respective status information of one or more network elements during an epoch, the epoch defining a time interval; and
generate a user interface displaying the respective status information in a timeline comprising one or more of the epochs.

9. The system of claim 8, wherein the epoch and a type of the data is customized by user input.

10. The system of claim 9, the at least one computer-readable storage medium storing instructions which, when executed by the one or more processors, cause the system to:
receive, from user input, a metric associated with the type of data, wherein the logical model determines the respective status based on the metric.

11. The system of claim 8, the at least one computer-readable storage medium storing instructions which, when executed by the one or more processors, cause the system to:
classify the respective status information into a type of error;
aggregate all objects from the network associated with the type of error; and
display the aggregation of the type of error, wherein the display comprises an option to view a number of instances the type of error occurred during the epoch.

12. The system of claim 8, the at least one computer-readable storage medium storing instructions which, when executed by the one or more processors, cause the system to:
    classify the respective status as a type of error;
    determine an action to recommend based on the type of error; and
    provide an option configured to display the action.

13. The system of claim 8, the at least one computer-readable storage medium storing instructions which, when executed by the one or more processors, cause the system to:
    generate a report based on the respective status information, the report comprising the type of error and the recommended action, wherein the report enables a user to modify at least one of a range of epochs included in the report or a number of instances aggregated in the report.

14. The system of claim 8, wherein the data is received from a collection file associated with a timestamp defining the epoch, the at least one computer-readable storage medium storing instructions which, when executed by the one or more processors, cause the system to:
    analyze the collection file to identify the respective status information of the one or more objects from the network during the timestamp;
    determine an action to recommend based on the respective status information; and
    provide an option configured to display the action.

15. A method comprising:
    obtaining, from at least one of a plurality of controllers on a network, one or more logical models of the network, the one or more logical models comprising configurations of one or more objects defined for the network;
    determining network statistics based on network traffic;
    identifying, based on the one or more logical models and the network statistics, a topology of the network and respective status information of one or more network elements during an epoch, the epoch defining a time interval; and
    generating a user interface displaying the respective status information in a timeline comprising one or more of the epochs.

16. The method of claim 15, wherein the epoch and a type of the data is customized by user input.

17. The method of claim 16, the method further comprising receiving, from user input, a metric associated with the type of data, wherein the logical model determines the respective status based on the metric.

18. The method of claim 15, the method further comprising:
    classifying the respective status information into a type of error;
    aggregating all objects from the network associated with the type of error; and
    displaying the aggregation of the type of error, wherein the display comprises an option to view a number of instances the type of error occurred during the epoch.

19. The method of claim 15, the method further comprising:
    classifying the respective status as a type of error;
    determining an action to recommend based on the type of error; and
    providing an option configured to display the action.

20. The method of claim 15, wherein the data is received from a collection file associated with a timestamp defining the epoch, the method further comprising:
    analyzing the collection file to identify the respective status information of the one or more objects from the network during the timestamp;
    determining an action to recommend based on the respective status information; and
    providing an option configured to display the action.

* * * * *